US006311021B1

(12) United States Patent
Kosich

(10) Patent No.: US 6,311,021 B1
(45) Date of Patent: Oct. 30, 2001

(54) MULTI-CANDELA ALARM UNIT

(75) Inventor: Joseph Kosich, South Toms River, NJ (US)

(73) Assignee: Wheelock, Inc., Long Branch, NJ (US)

( * ) Notice: Subject to any disclaimer, the term of this patent is extended or adjusted under 35 U.S.C. 154(b) by 0 days.

(21) Appl. No.: 09/449,276

(22) Filed: Nov. 24, 1999

(51) Int. Cl.[7] .............................. G03B 15/03; G03B 7/26

(52) U.S. Cl. ........................... 396/164; 396/206; 340/331

(58) Field of Search ..................................... 340/331, 635, 340/293, 332; 354/139, 145, 149, 416; 396/156, 164, 205, 206

(56) References Cited

U.S. PATENT DOCUMENTS 4,853,600 * 8/1989 Zeltner et al. ........................ 396/164
4,900,990 * 2/1990 Sikora .................................. 396/164
4,951,081 * 8/1990 Hosomizu et al. .................. 396/164
5,019,805 * 5/1991 Curl et al. ............................ 340/628
5,570,077 * 10/1996 Swieboda ............................. 340/628
5,694,118 * 12/1997 Park et al. ........................... 340/628

OTHER PUBLICATIONS

"Select a Strobe Series" American Security Equipment Company, *National Fire Protection Association Tradeshow*, Baltimore, MD, May 16, 1999.

"Wall & Ceiling: Select a Strobe" American Security Equipment Company, *National Fire Protection Association Tradeshow*, Cincinnati, Ohio, May 17, 1998.

"Flashtubes" *EG&G Heimann Optoelectronics Catalog*, pp. front and back pages and selected pages, 1991.

* cited by examiner

*Primary Examiner*—David M. Gray
(74) *Attorney, Agent, or Firm*—Moser, Patterson & Sheridan LLP

(57) ABSTRACT

A strobe alarm unit having a plurality of selectable candela settings or intensity levels, for allowing an alarm installer to select a particular candela setting for the alarm unit in the field. The strobe alarm unit incorporates a voltage doubler circuit that allows a single storage capacitor to provide the necessary discharge voltage across the flashtube to provide the plurality of selectable candela settings.

20 Claims, 12 Drawing Sheets

MULTI-CANDELA ALARM UNIT

The present invention generally relates to an alarm unit. More particularly, the invention is a strobe alarm unit having a plurality of selectable candela settings or intensity levels, thereby allowing an alarm installer to select a particular candela setting for the alarm unit in the field for a particular application.

BACKGROUND OF THE DISCLOSURE

Strobe lights have been widely employed in warning systems such as fire warning systems, security systems and the like. In fact, various governmental regulations and/or standards, e.g., from the American Disability Act (ADA) and the Underwriters Laboratories (UL), have been established to define various requirements, e.g., strobe frequency and light output.

One important requirement is the light output of a strobe alarm unit for a particular application. For example, UL has adopted standards that require certain levels of light output from strobe alarm units for fire safety warning systems. Depending on a particular application and/or the location where the strobe alarm units are mounted, light output may range from 15 candela to 110 candela. In response, manufacturers of strobe alarm units have provided different models of strobe alarm units with each model having a specified light output to meet a particular application. For example, a ceiling mounted strobe alarm unit may have a particular light output intensity that is different from a wall mounted strobe alarm unit.

Although manufacturers are able to meet these different light output requirements by offering different models of strobe alarm units, such multitude of different configurations of strobe alarm units increases manufacturing cost and complexity. For example, different components for different models of strobe alarm units must be purchased and stocked as inventories. Different manufacturing lines must be operated and maintained. A single engineering modification may result in multiple changes across all configurations of strobe alarm units. Customer orders must be carefully tracked and filled in accordance with request for different models of strobe alarm units.

On the customer side, an alarm installer must also carefully mount the correct strobe alarm unit with a particular light output to meet the requirement of a particular application. If an installer incorrectly mounts strobe alarm units for a particular application or strobe alarm units with the wrong light intensity are received, the installer may face a substantial loss in time in having to reinstall the alarm units or to wait for the proper replacement of strobe alarm units to arrive. Such cost and inefficiency can be eliminated if the intensity level of the strobe alarm unit can be selectively set in the field.

Therefore, a need exists in the art for a strobe alarm unit having a plurality of selectable candela settings or intensity levels, thereby allowing an alarm installer to select a particular candela setting for the alarm unit in the field.

SUMMARY OF THE INVENTION

The present invention is a strobe alarm unit having a plurality of selectable candela settings or intensity levels, thereby allowing an alarm installer to select a particular candela setting for the alarm unit in the field. The strobe alarm unit incorporates a voltage doubler circuit that allows a single storage capacitor to provide the necessary discharge voltage across the flashtube to provide the plurality of selectable candela settings.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
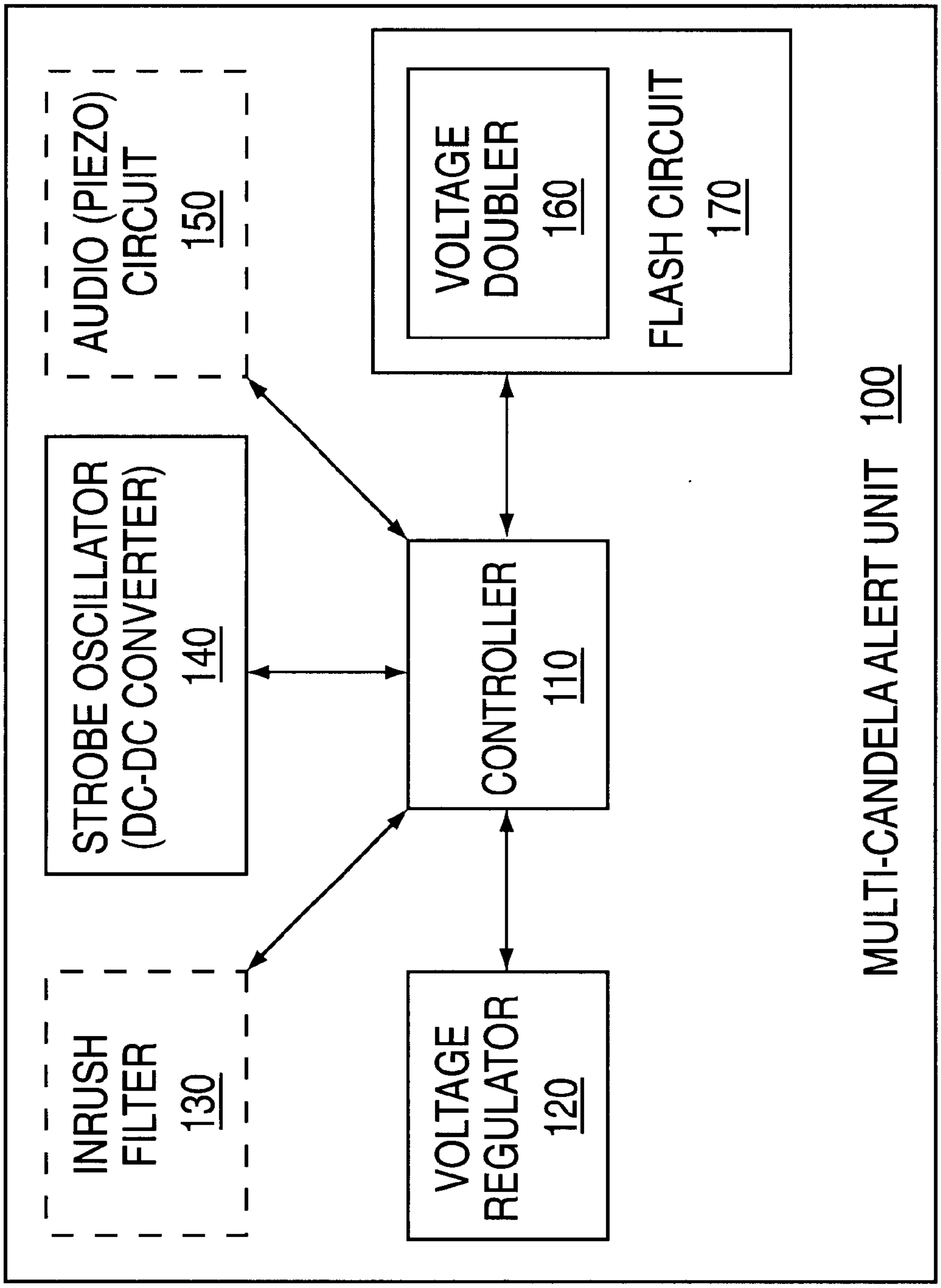
FIG. 1 depicts a block diagram of an alarm unit of the present invention.

FIG. 1 depicts a block diagram of a strobe alarm unit 100 of the present invention where the strobe alarm unit 100 provides a plurality of candela settings that can be selected by an installer in the field. The alert unit 100 comprises a controller 110, a voltage regulator 120, an inrush filter circuit 130, a strobe oscillator circuit 140, an audio circuit 150, and a flash circuit 170 having a voltage doubler 160. It should be understood that although the present invention is directed toward providing an alarm unit with a selectable strobe intensity feature, the present invention can be deployed in a strobe only alarm unit or a strobe alarm unit having audio warning capability.

In brief, the alarm unit 100 is generally powered by a supply voltage of 12 volts or 20–31 volts, and such supply voltage may be either D.C. supplied by a battery or a full-wave rectified voltage. In one embodiment of the present invention, the controller 110 is a microcontroller that operates under a supply voltage of 5 volts supplied by the voltage regulator 120. The microcontroller 110 serves to control and regulate various functions of the alarm unit.

For example, the microcontroller 110 serves to control the audio circuit 150 for generating an audio warning, e.g., via a horn, buzzer and the like. The microcontroller 110 can control and regulate various audible features such as the frequency of the audio warning, e.g., to generate a Code 3 audio pattern. It should be noted that the audio circuit 150 shown in a dashed box can be optionally omitted if the alarm unit is implemented as a strobe only alarm unit.

The inrush filter 130 serves to limit the effect of an inrush condition. Inrush is a condition that may occur upon initial power-on, where a higher than average current is present in the alarm unit when power is applied to the power terminals for the first time to start alarm notification. Inrush can cause a momentary overload in the power supply and may cause the overcurrent protection in the panel to activate which can prevent the alarm units from operating. The overload may also damage relay contacts located in the panel which switch the loop to an alarm condition. Similarly, the inrush filter 130 shown in a dashed box can be optionally omitted if the inrush condition is not present or is addressed outside of the alarm unit.

The strobe oscillator or DC-to-DC converter 140 converts the input voltage, e.g., 24 volts, to a voltage, e.g., 125–250 volts, sufficient to fire the flashtube within the flash circuit 170. In a preferred embodiment of the present invention, the strobe oscillator 140 incorporates a switch having a plurality of positions, e.g., four positions, that are representative of a plurality of intensity settings. By setting the switch to a particular position, the alarm unit will produce a predefined intensity level associated with that particular switch position. For example, setting the switch to a 110 candela setting will cause the alarm unit to produce a flash having an light output intensity of at least 110 candela upon activation of the alarm unit. The switch is coupled to an actuator assembly (not shown) and disposed within the alarm unit housing such that the switch is tamper resistant after installation, while the selected intensity setting is still clearly visible for inspection. The novel actuator assembly and 30 associated display or menu is disclosed in US patent application entitled "Strobe Alarm With Strobe Intensity Selector Switch" with application Ser. No. 09/449,277, which is herein incorporated by reference and is filed simultaneous herewith.

In turn, the flash circuit 170 includes the voltage doubler 160 that serves the important function of presenting a voltage across the flashtube that is twice the actual voltage that is stored in a storage capacitor, thereby allowing the flashtube to reliably fire at lower voltages. The importance of the voltage doubler 160 is due to the fact that the present alarm unit provides the selectable multi-candela feature. This feature places a difficult constraint on the circuitry of the alarm unit in that different voltages must be presented across the flashtube. Namely, the flashtube will be fired by a voltage that is dictated by a particular intensity level setting. As such, since the alarm unit is expected to produce intensity levels ranging widely from 15–110 candela, the alarm unit must reliably operate with relatively low voltages stored on a single storage capacitor. Without the reliability provided by the voltage doubler 160, multiple storage capacitors with additional switching will be required, especially when the selectable multi-candela feature offers a wide range of intensity levels. More specifically, the voltage doubler 160 allows the alarm unit of the present invention to reliably offer a selectable multi-candela feature that offers four (4) candela settings that widely ranges from 15 to 110 candela. The ability to offer a wide range of candela settings serves to eliminate more models of alarm units. For example, a manufacturer may offer a single strobe alarm unit having selectable candela settings of 15, 30, 75, and 110, instead of providing two models of strobe alarm unit with one model having selectable candela settings of only 15 and 30 and another model having candela settings of only 75 and 110. Typically, a multi-candela range exceeding 35 candela (i.e., a difference greater than 35 candela between the lower and higher candela setting) will need the voltage doubler 160 to ensure reliable flashtube firing.

Figure 2:
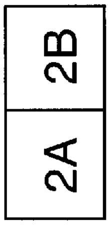
FIG. 2 is a circuit diagram of one embodiment of an alarm unit employed in the present invention.
Figure 2A:
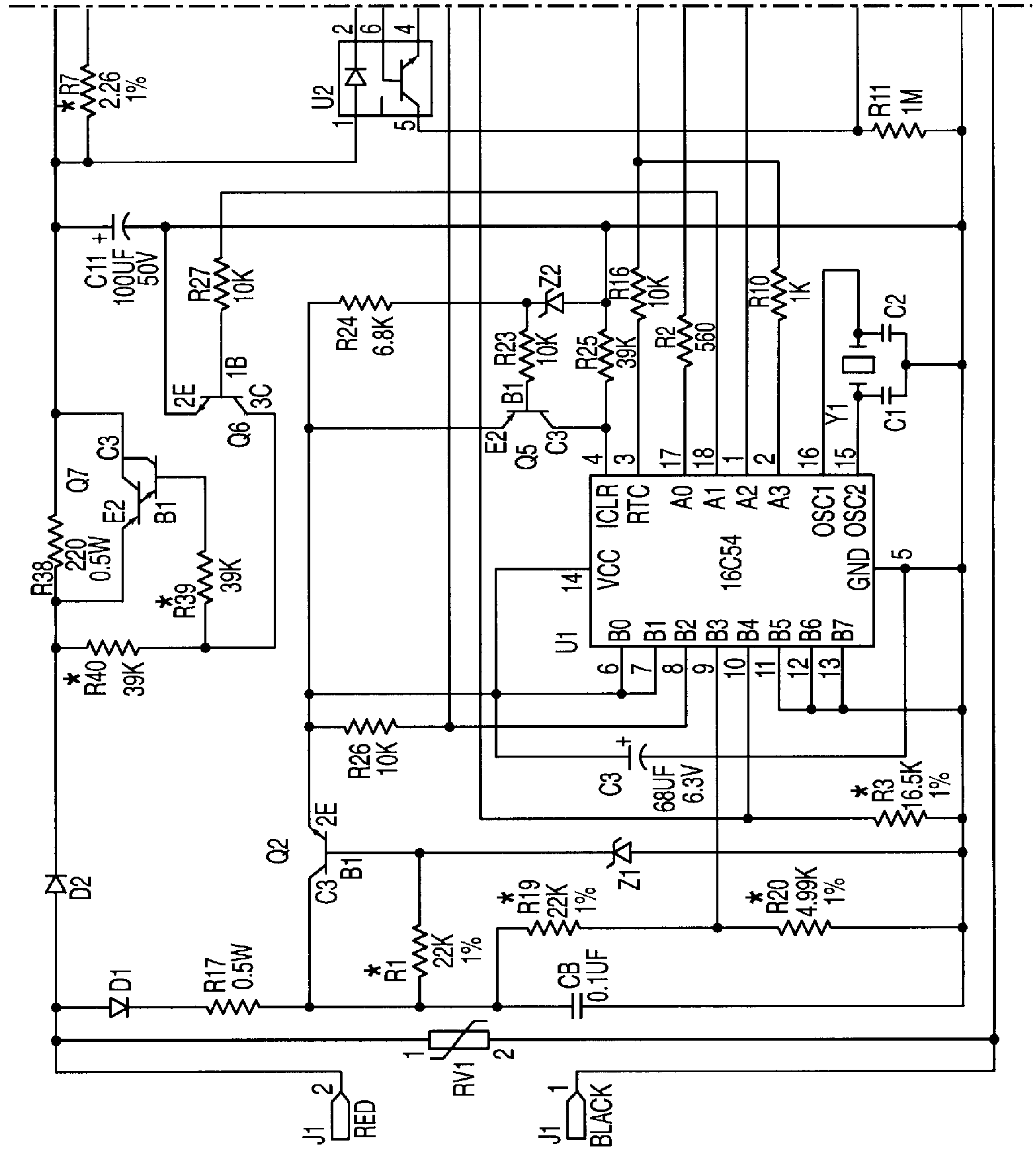
Figure 2B:
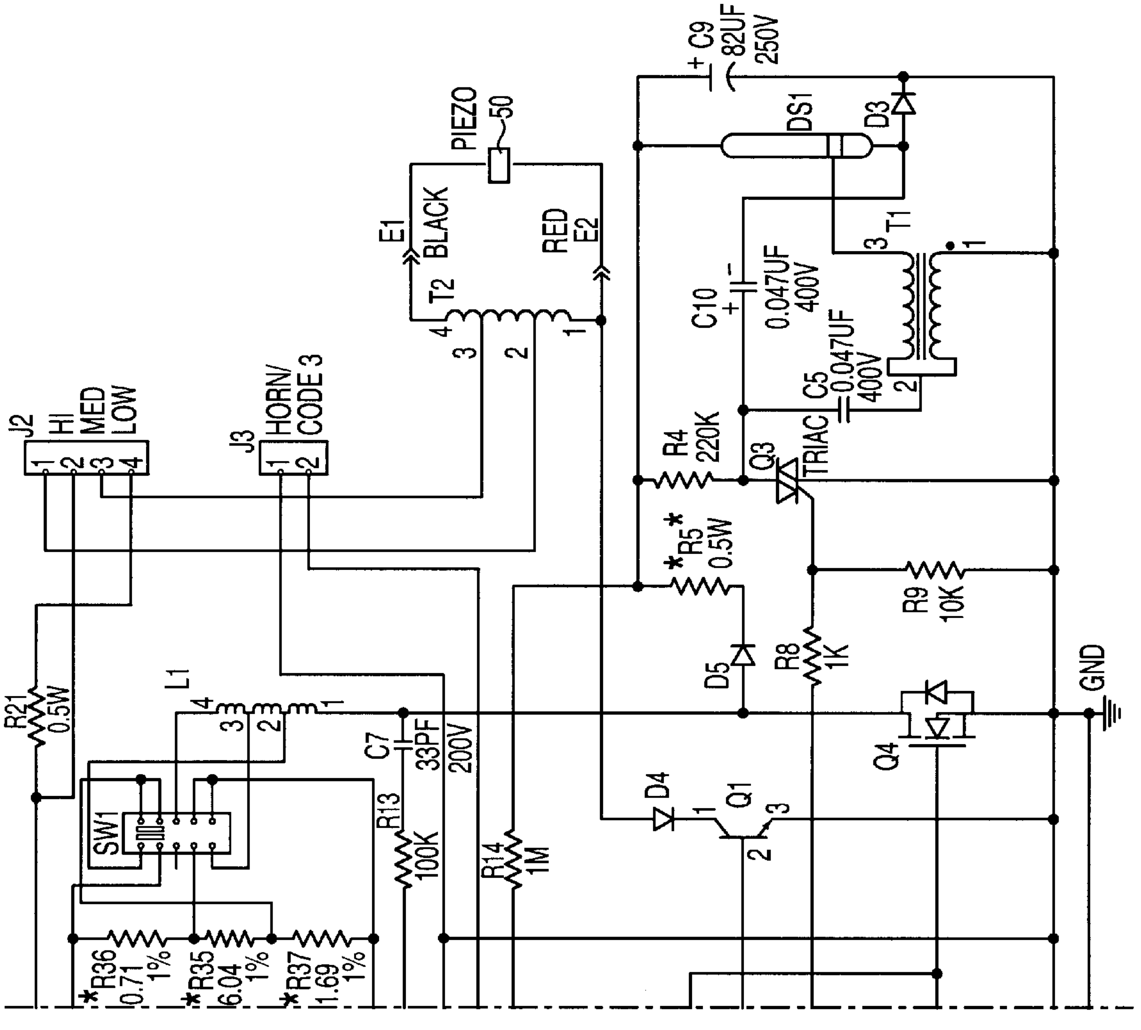

FIG. 2 is a detailed circuit diagram of one embodiment of an alarm unit employed in the present invention. To the extent possible and to assist the reader, the components within FIG. 2 will be described and grouped in accordance with the block diagram of FIG. 1, i.e., described within the context of a particular circuit of FIG. 1. However, those skilled in the art will realize that this grouping scheme is based on the functions provided by the collective components and should not be interpreted as limiting a particular component to a particular circuit. For example, a particular component may serve multiple functions or a component may serve support functions that are not broadly described in FIG. 1.

Additionally, the various circuits described in FIG. 1 should not be interpreted that these circuits must be implemented as separate modules or circuits. For example, the voltage doubler 160 can be implemented outside of the flash circuit 170 or can be logically grouped as part of another circuit.

The alarm unit of FIG. 2 includes an inrush filter or limiting circuit comprising resistors R27, R38, R39, and R40, capacitor C11 and transistors Q6 and Q7. In accordance with the invention, an inrush limiting resistance, e.g., resistor R38, is included in the circuit along with a switch Q7. The resistor R38 and the switch Q7 are connected in parallel. The switch Q7 is open for a period of time after power is applied to the power terminals 2 (J1, red) and 1 (J1, black). The period of time should be sufficient to minimize inrush, e.g., 100–400 milliseconds. After this period, the switch Q7 is turned on by the microcontroller U1 and remains on as long as power stays on. As a result, current ceases to flow through R38, leaving the minimal resistance in the current path between L1 and the terminal 2 (J1, red). In addition, at regular intervals, the software of the microcontroller U1 will refresh this function to be certain that the switch Q7 remains on thereafter. One skilled in the art would appreciate that the resistor R38 could be replaced with an equivalent resistance branch or network and the microcontroller could be replaced with a simple timer providing the desired off-period of the switch Q7. A detailed discussion of the inrush filter is described in U.S. Pat. No. 5,673,030, issued on Sep. 30, 1997, which is hereby incorporated by reference.

Returning to FIG. 2, the alarm unit depicts a microprocessor-controlled audible/visual alarm unit. The alarm unit is energized by a D.C. power source connected to power terminals 2 (J1, red) and 1 (J1, black). A voltage regulator circuit 120 provides the necessary voltage level to power the microcontroller U1. Voltage regulator circuit 120 comprises a varistor RV1, resistors R1, R17, transistor Q2, capacitor C3 and diodes D1 and Z1. The metal oxide varistor RV1 is connected across the D.C. input to protect against transients on the input. Resistors R1 and R17 are connected in series between the cathode of a diode D1 and the base electrode of a transistor Q2, and also to the cathode of a Zener diode Z1 which provides a 5.60 volts ±5% reference. The collector of Q2 is connected to the common node of R1 and R17. Transistor Q2 provides 5 volts to microcontroller U1 across terminals $V_{cc}$ and GND. A capacitor C3 connected across the $V_{cc}$ and GND terminals of U1 acts as a filter and will hold the voltage across U1 during the power drop outs which are used in the system as control signals.

A reset circuit for the microcontroller U1 includes a resistor R24 and a Zener diode Z2 connected in series between the terminals $V_{cc}$ and GND of microcontroller U1, a switch Q5 with its emitter electrode connected to the $V_{cc}$ terminal, a resistor R25 connected between the collector electrode of the switch Q5 and GND, and a resistor R23 connected between the base electrode of the switch Q5 and the anode of the diode Z2. The junction between the switch Q5 and the resistor R25 is connected to the "!CLR" terminal 4 of the microcontroller U1.

Oscillations at a frequency of 4 MHz are applied to the terminals OSC1 and OSC2 of the microcontroller by a clock circuit consisting of a resonator Y1 and a pair of capacitors C1 and C2 connected between GND and the first and second oscillator inputs, respectively. It should be noted that the resonator Y1 provided below in the components table effectively incorporates capacitors C1 and C2. As such, capacitors C1 and C2 are not shown in the components table below.

Resistors R19 and R20 and a capacitor C8 provide a means at a microcontroller input terminal 9 for detecting gaps or drop outs in input power which indicate the presence of either a full wave rectified (FWR) input voltage or a sync or control pulse.

In the alarm unit of FIG. 2, the strobe oscillator or D.C.-to-D.C. converter 140 comprises an opto-coupler U2, resistors R13, R7, R36, R35, R37, R16, R10 and R11, transistor Q4, capacitor C7, inductor L1, and switch SW1. The flash circuit 170 comprises transformer T1, resistors R14, R8, R9, R5, R4, capacitors C5, C9, C10, flashtube DS1, diodes D3, D5 and triac Q3, where capacitor C10 and diode D3 form the voltage doubler 160. Due to the interaction between the strobe oscillator 140 and flash circuit 170, the functions of these two circuits are described jointly below.

The strobe oscillator utilizes an opto-coupler U2 to control the D.C.-to-D.C. conversion of the input voltage to a voltage sufficient to fire the flashtube. Capacitor C9 connected in parallel with the flashtube DS1 is incrementally charged, through a diode D5 and a resistor R5, from an inductor L1 that has three separable inductances, which is cyclically connected and disconnected across the D.C. supply. It should be noted that due to pin constraint, inductor L1 is shown having only three separable inductances for providing four candela settings of 15, 30, 75 and 110 candela. As such, 15 and 30 candela settings use the same inductance.

At the beginning of a connect/disconnect cycle, the light emitting diode (LED) and transistor of the optocoupler U2 are both off and the switch Q4 is on, completing a connection between the inductor L1 and the D.C. power source. As the current flow through L1 increases with time, the LED of U2 energizes and turns on the optically coupled transistor of U2 which, in turn, shuts off the switch Q4, thereby disconnecting L1 from the D.C. source. During the off period of the switch Q4, energy stored in the inductor L1 is transferred through a diode D5 and a resistor R5 to the series-connected capacitor C9. The capacitor C7 and the resistor R13 are connected in series between the diode D5 and the base of the transistor of the optocoupler U2. When the inductor L1 has discharged its stored energy into the capacitor C9, the LED of U2 ceases to emit light and the transistor of U2 turns off. This, in turn, causes Q4 to turn on, thereby beginning the connect/disconnect cycle again.

The on and off switching of Q4 and, therefore, the rate at which the increments of energy are transferred from the inductor L1 to the capacitor C9, is determined by the switching characteristics of the optocoupler U2, the values of the resistors R10, R11, R7, R36, R35, and R37, the value of the inductor L1 depending on the setting of switch SW1 and the voltage of the D.C. source, and may be designed to cycle at a frequency in the range from about 3000 Hz to 30,000 Hz. Resistors R7, R36, R35, and R37 are sensing resistors with each correlating to one of four candela settings 15, 30, 75 and 110 candela. In operation, if only sensing resistor R7 is coupled to the appropriate tap on the inductor L1 via switch SW1, then a 110 candela is selected, i.e., the least resistance with the highest energy. Conversely, if all the sensing resistors R7, R36, R35, and R37 are coupled to the appropriate tap on the inductor L1 via switch SW1, then a 15 candela is selected, i.e., the highest resistance with the least energy. Thus, switch SW1 serves as a bridge between the appropriate resistor tap and the appropriate inductor tap. It should be noted that strobe oscillator operates in conjunction with the microcontroller U1 to turn "on" and "off" at a certain rate to control the energy throughput via software as discussed below. Namely, the microcontroller U1 will typically cause the strobe oscillator to operate at a fixed frequency of approximately 7 kHz. Thus, the pulse width will change in accordance with the input voltage, i.e., at lower voltage, the pulse width is greater, whereas at higher voltage, the pulse width is less. However, at low input voltage, e.g., 16 volts, the software will operate at a variable frequency. It should be understood that the present invention can be adapted to solely operate with pulse width modulation (PWM) with a fixed frequency using a PWM controller.

The repetitive opening and closing of the switch Q4 eventually charges the capacitor C9 to the point at which the voltage across it attains a threshold value required to fire the flashtube DS1. Overcharging of capacitor C9 is prevented by resistors R14 and R3 connected in series between the GND terminal and the positive electrode of the capacitor C9. The values of these resistors are chosen to feed a portion of the voltage across the capacitor C9 back to the microcontroller U1. By checking for a relative high or low level after a trigger signal, the microcontroller U1 can determine if the flashtube DS1 fired. If the flashtube DS1 did not fire, the opto-oscillator circuit is shut down by way of opto-coupler U2 to prevent overcharging of the capacitor C9. This regulation of the capacitor's C9 voltage occurs in all modes of operation including D.C., FWR, Sync and non-Sync. The microcontroller implementation is less costly than a Zener diode implementation and provides greater performance by eliminating Zener tolerance issues.

An important aspect of the present invention is the voltage doubler's ability to allow the present alarm unit to offer four candela settings (as low as 15 candela at about 125 volts and as high as 110 candela at about 250 volts) using only a single storage capacitor C9. Generally, in order to generate a high candela flash, the storage capacitor C9 must store a higher voltage and vice versa for a low candela flash. Namely, the capacitor C9 is capable of firing the flashtube at four different intensities. It has been observed that a voltage below 200 volts will not reliably fire the flashtube DS1, thereby causing the undesirable effect of having the alarm unit miss flashes. Without the voltage doubler, the strobe alarm unit will have to incorporate additional capacitors with additional switching capabilities in order to provide the present selectable multi-candela feature having a wide multi-candela range of four candela settings of 15 to 110. Currently, a simple switch SW1 having two poles with four positions can be used to provide four candela settings. Without the present voltage doubler, more complex switching mechanisms, and additional capacitors must be deployed in the alarm unit, thereby increasing the cost and physical size of the alarm unit.

Specifically, as capacitor C9 is fully charged for a particular intensity level, capacitors C5 and C10 are also simultaneously charged to the same voltage as that of C9. When U1 sends a signal to discharge the flashtube via triac Q3, the common terminals of both capacitors C5 and C10 are brought to GND. The voltage of C5 is effectively placed across the trigger coil primary that induces the high voltage that ionizes the gas in the flashtube. Simultaneously, the voltage of capacitor C10 is added to the capacitor C9, thereby doubling the amount of voltage that is present across the terminals of the flashtube DS1.

The flash circuit 170 includes a circuit for triggering the flashtube DS1. The trigger circuit includes a resistor R4 connected in series to the combination of a switch Q3, which in this embodiment is an SCR (or a TRIAC), connected in parallel with the series combination of a capacitor C5 and the primary winding of an autotransformer T1. The secondary winding of the autotransformer T1 is connected to the trigger band of the flashtube DS1. When the switch Q3 is turned on, the capacitor C5 pulses the primary winding of the transformer T1 and induces a high voltage in the secondary winding which, if the voltage on the capacitor C9 equals the threshold firing voltage of the flashtube, causes the flashtube DS1 to conduct and quickly discharge the capacitor C9. Q3 is turned on from a microcontroller output pin 1 and through a voltage divider composed of the resistors R8 and R9.

Optimally, the alarm unit depicted in FIG. 2 may also include an audio alarm circuit 150 comprised, for example, of a resistors R2 and R21, a switch Q1, a diode D4, an autotransformer T2 and a piezoelectric element 50 connected as shown. The autotransformer T2 provides a voltage boost to the piezoelectric element 50 so that the audible alarm has more volume. The jumper selectors J2 and J3 provide a means for adjusting the alarm volume and for selecting an audio pattern such as Code 3.

In the alarm unit shown, both the audible and visual alarm signals are controlled by the microcontroller U1, the audible signal being operated via an output terminal 17 and the visual signal being triggered via the output terminal 1. However, one skilled in the art will appreciate that a software timer means can be employed to cause the strobe to flash, e.g., in the event of a malfunction.

By way of example, the circuit shown in FIG. 2, when using a 24 volt D.C. power source and producing a strobe with selectable candela settings of 15, 30, 75 and 110 candela brightness, may use the following parameters to obtain the above-described switching cycle:

| DESIGNATION | COMPONENT DESCRIPTION | QTY | SMT PART |
|---|---|---|---|
| 1 | PCB, AH/AS | 1 | P83786 |
| 2 | FLTB, TRIG COIL 1.8J | 1 | P83061-005 |
| 3 | REFL, STRB | 1 | P83861 |
| C3 | CAP 68uF 10% 6.3V RT, SM | 1 | P83038-003 |
| C5, C10 | CAP .047uF 5% 400V R/F | 2 | P30393-082 |
| C7 | CAP 33PF 5% 200V A/C SM | 1 | P83037-001 |
| C8 | CAP .10uF 20% 100V A/C SM | 1 | P83037-009 |
| C9 | CAP 82uF 10% 250V R/E | 1 | P83377-004 |
| C11 | CAP 100uF 10% 50V R/E | 1 | P80016-002 |
| D1, D2 | DIODE, CMR1-04M 400V SM | 2 | P83039-002 |
| D3 | DIODE, 3A 400V SM | 1 | P83039-005 |
| D4, D5 | DIODE, CMR1U-04M 400V SM | 2 | P83039-003 |
| J1 | CONN, MALE 2P | 1 | P83489-002 |
| J2 | HDR, R/A 4P | 1 | P83090-004 |
| J3 | HDR, R/A 2P | 1 | P83090-002 |
| L1 | IND ASY, 6.8mH MULTI-TAP | 1 | P82466-005 |
| Q1 | XSTR, 2TX455 PREP | 1 | P80034-03920 |
| Q2, Q6 | XSTR, SSTA06 SM | 2 | P83488-002 |
| Q3 | TRIAC, LOGIC L401E5 PREP | 1 | P83448-001 |
| Q4 | XSTR, IRF710 | 1 | P80034-007 |
| Q5 | XSTR, SST2907A SM | 1 | P83488-001 |
| Q7 | XSTR, FMMT734 PNP SM | 1 | P83488-006 |
| R1, R19 | RES ¼W 22K OHMS 5% SM | 2 | P83041-223 |
| R11, R14 | RES ¼W 1M OHM 5% SM | 2 | P83041-105 |
| R13 | RES ¼W 100K OHMS 5% SM | 1 | P83041-104 |
| R17 | RES ½W 330 OHMS 5% SM | 1 | P83043-331 |
| R2 | RES ¼W 560 OHMS 5% SM | 1 | P83041-561 |
| R20 | RES ¼W 4.99K OHMS 1% SM | 1 | P83042-4991 |
| R21 | RES ½W 680 OHMS 5% SM | 1 | P83043-681 |
| R24 | RES ¼W 6.8K OHMS 5% SM | 1 | P83041-682 |
| R25, R39, R40 | RES ¼W 39K OHMS 5% SM | 3 | P83041-393 |
| R38 | RES ½W 220 OHMS 5% SM | 1 | P83043-221 |
| R3 | RES ¼W 16.5K OHMS 1% SM | 1 | P83042-1652 |
| R35 | RES ¼W 3.01 OHMS 1% SM | 1 | P83042-3R01 |
| R36 | RES ¼W 0.71 OHMS 1% SM | 1 | P83042-R715 |
| R37 | RES ¼W 1.91 OHMS 1% SM | 1 | P83042-1R91 |
| R4 | RES ¼W 220K OHMS 5% SM | 1 | P83041-224 |
| R5 | RES ½W 27 OHMS 5% SM | 1 | P83043-270 |
| R6, R15, R22, R30, R31, | JMPR, ZERO OHM RES SM | 7 | P83497-003 |
| R7 | RES ¼W 2.26 OHMS 1% SM | 1 | P83042-2R26 |
| R8, R10 | RES ¼W, 1.0K OHMS 5% SM | 2 | P83041-102 |
| R9, R16, R23, R26, R27 | RES ¼W 10K OHMS 5% SM | 5 | P83041-103 |
| RV1 | VRIS, 40VAC/56VDC PREP | 1 | P31963-00825 |
| SW1 | SWITCH, DP4T | 1 | P83855 |
| T2 | AUTO XFMR ASY, YEL/VIO | 1 | P82466-003 |
| U1 | MICROCTRLR, AS/AH/RSS | 1 | P82488-046 |
| U2 | IC, 4N35 TOSHIBA | 1 | P80040-131 |
| Y1 | CERA, RESN, 4.00MHZ | 1 | P83792 |
| Z1 | ZNR DIODE, 1N4626 5% 5.6V SM | 1 | P83047-001 |
| Z2 | ZNR DIODE, 1N4619 3.0V 5% SM | 1 | P83047-004 |

Figure 3A:
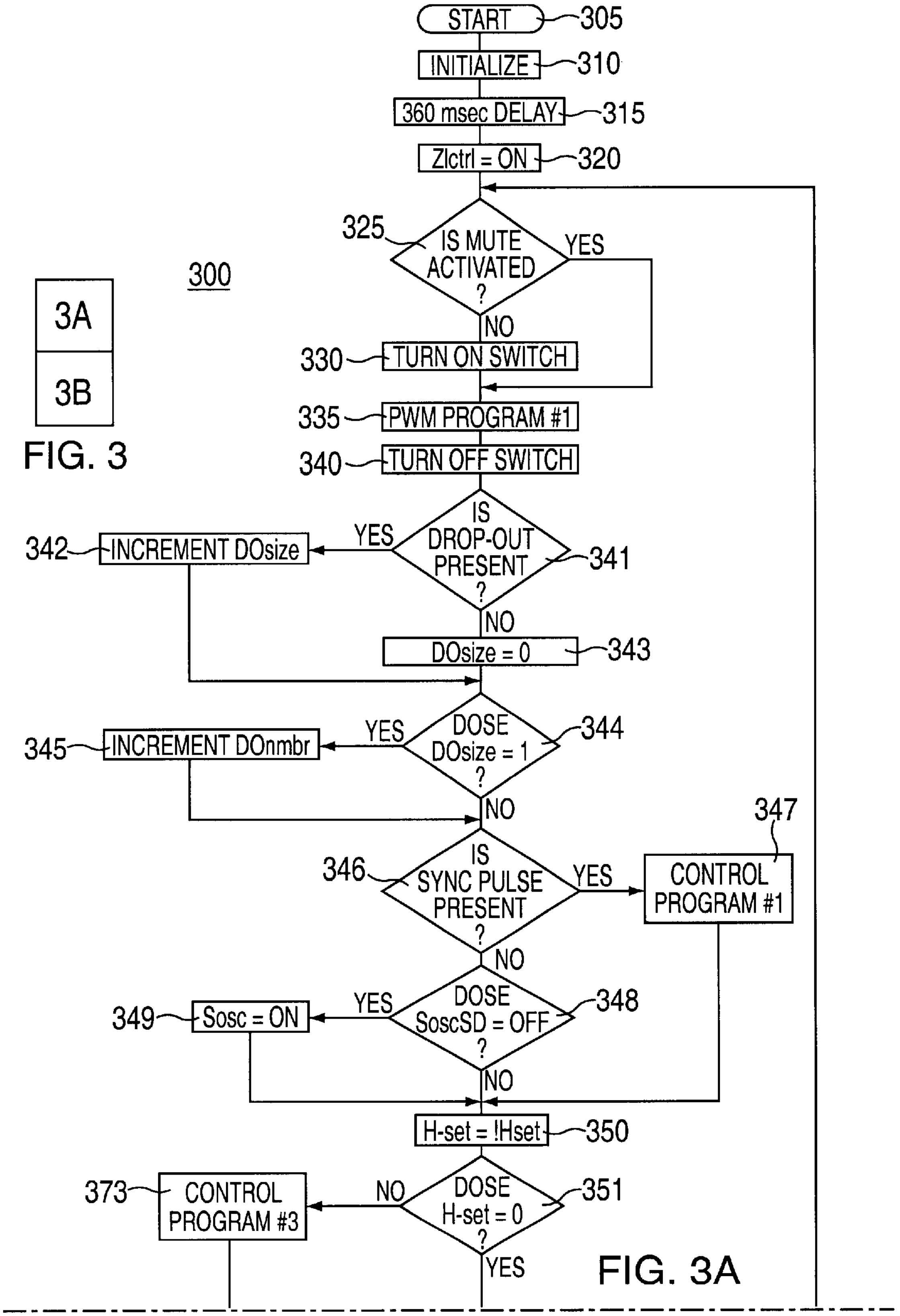
FIG. 3 illustrates a flowchart of an embodiment of a software routine of the main program of the microcontroller of the alarm unit as shown in FIG. 2.
Figure 3B:
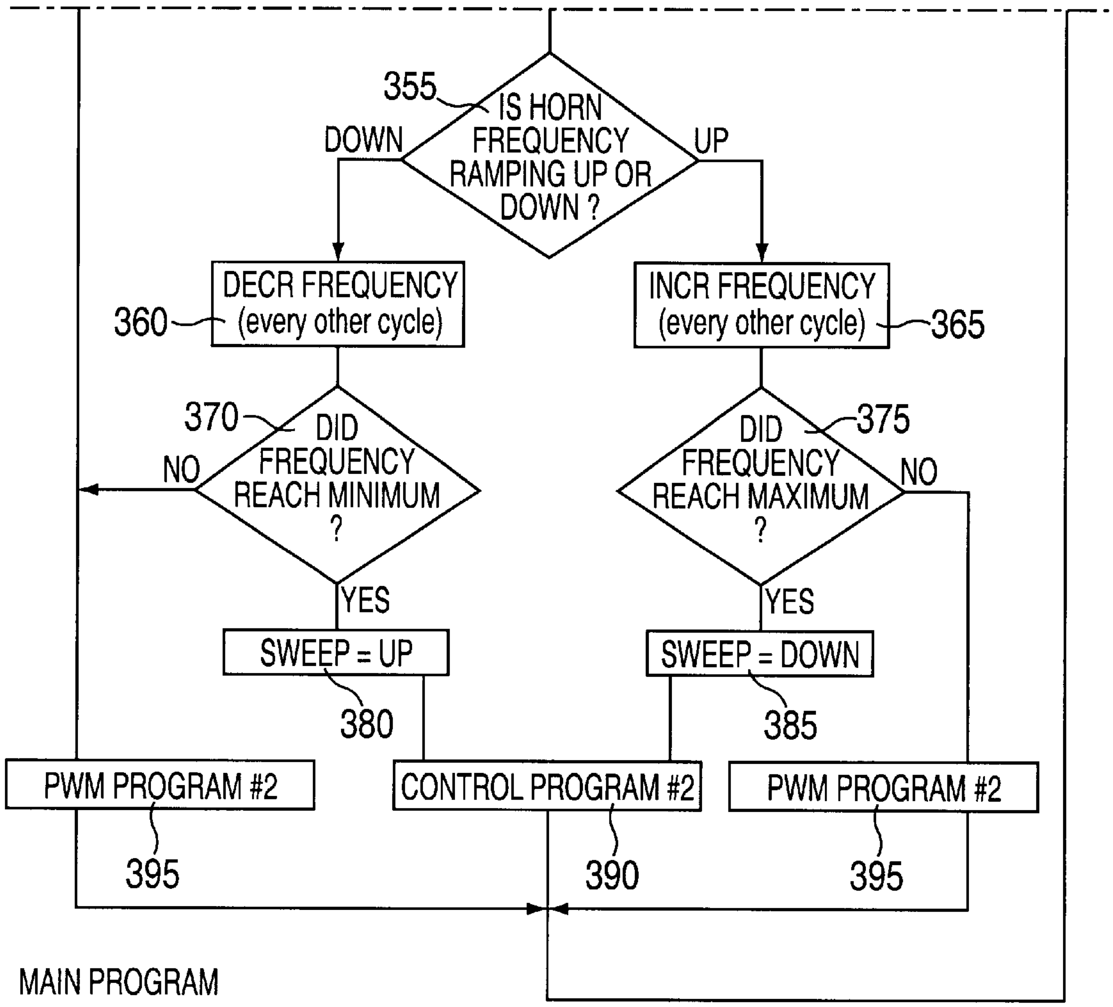

FIG. 3 illustrates a flowchart of an embodiment of a software routine or method of the microcontroller of the alarm unit as shown in FIG. 2. More specifically, method 300 starts in step 305 and proceeds to step 310 where initialization is performed, e.g., one or more registers and variables are initialized.

In step 315, method 300 generates a delay, preferably 360 milliseconds (msec.). Namely, a delay is generated at the alarm unit during which time the switch Q6 and Q7 are off to address inrush conditions as shown in FIG. 2.

In step 320, zero-inrush control (ZIctrl) is turned "ON". More specifically, the switch Q6 and Q7 are turned on, thereby redirecting the current through Q7 as shown in FIG. 2.

In step 325, method 300 queries whether the horn is currently being muted (represented by the variable or flag "MUTE"), as in the case if the Code 3 signal is in one of the half-second or one and one-half second silence periods, or if the "SILENCE" feature has been activated. If the query is affirmatively answered, then method 300 proceeds to step 335 where PWM program #1 is entered for a pulse width modulation cycle for the strobe as discussed below. If the query is negatively answered, then method 300 proceeds to step 330, where the microcontroller U1 of the alarm unit will turn on the horn (turn on switch) by sending out a high signal from the microcontroller to turn on switch Q1 as shown in FIG. 2.

Return from PWM program #1, method 300 proceeds to step 340, where the microcontroller U1 of the alarm unit will turn off the horn (turn on switch) by sending out a low signal from the microcontroller to turn off switch Q1 as shown in FIG. 2.

In step 341, method 300 queries whether a voltage drop-out is present. If the query is affirmatively answered, then method 300 proceeds to step 342, where a counter "DOsize" is incremented. Namely, method 300 is checking the input voltage which is typically set at 24 volts. Detection of the leading edge of a drop out initiates a counter "DOsize", such that a voltage drop-out greater than five (5) msec. constitutes the presence of a voltage drop-out. If the query is negatively answered, then method 300 proceeds to step 343, where the counter "DOsize" is set to zero "0". Namely, no voltage drop-out is detected so that the counter "DOsize" is reset to zero for the next cycle.

In step 344, method 300 queries whether "DOsize" is equal to one ("1"). If the query is affirmatively answered, then method 300 proceeds to step 345, where a counter "DOnmbr" is incremented. Namely, the counter "DOnmbr" keeps track of the number of drop outs. If the query is negatively answered, then method 300 proceeds to step 346.

In step 346, method 300 queries whether a reference synchronization pulse is present. Namely, method 300 is determining if the drop out is sufficiently wide to constitute a sync/control pulse. If the query is affirmatively answered, then method 300 proceeds to control program #1 in step 347. If the query is negatively answered, then method 300 proceeds to step 348.

In step 348, method 300 queries whether the variable, "SoscSD", is set to "Off". If the query is affirmatively answered, then method 300 proceeds to step 349, where Sosc is turned "On". However, if the query is negatively answered, then method 300 proceeds to step 350.

In step 350, method 300 sets H-set to be not H-set. This variable relates to the horn program, i.e., control program #3 of the present invention. Namely, it is a toggle to access the control program #3 in step 373. In one embodiment, the control program #3 is accessed for every other cycle in the horn sweep.

In step 351, method 300 queries whether H-set is set equal to zero. Namely, method 300 is determining control program #3 should be accessed. If the query is negatively answered, then method 300 proceeds to control program #3 in step 373. If the query is affirmatively answered, then method 300 proceeds to step 355.

In step 355, method 300 queries whether the horn frequency is ramping up or ramping down. If the horn frequency is ramping down, method 300 proceeds to step 360, where the horn frequency is decreased to the next step, e.g., three (3) micro seconds (μsec.). If the horn frequency is ramping up, method 300 proceeds to step 365, where the horn frequency is increased to the next step, e.g., three (3) microseconds (μsec.).

In step 370, method 300 queries whether the horn frequency has reached the minimum horn frequency. If the query is negatively answered, then method 300 proceeds to step 395, where PWM program #2 is accessed. If the query is positively answered, then method 300 proceeds to step 380, where the variable "SWEEP" is toggled to change the sweep direction. Namely, the horn frequency has been decreased to a predefined point, e.g., 3,200 Hz and will be ramped up on the next cycle.

Similarly, in step 375, method 300 queries whether the horn frequency has reached the maximum horn frequency. If the query is negatively answered, then method 300 proceeds to step 395, where PWM program #2 is accessed. If the query is positively answered, then method 300 proceeds to step 385, where the variable "SWEEP" is toggled to change the sweep direction. Namely, the horn frequency has been increased to a predefined point, e.g., 3,800 Hz and will be ramped down on the next cycle.

In step 390, method 300 executes Control Program No. 2. Control Program No. 2 is responsible for the maintenance of various counters. First, these counters are used to detect the absence of a reference synchronization pulse. Failure to receive a reference synchronization pulse within a predefined time limit will cause the alarm unit to enter into automatic mode, where the activation of the flashtube and/or the horn are locally controlled without the need of reference synchronization pulses. Second, these counters are also used to implement the Code 3 pattern as discussed below.

Figure 4A:
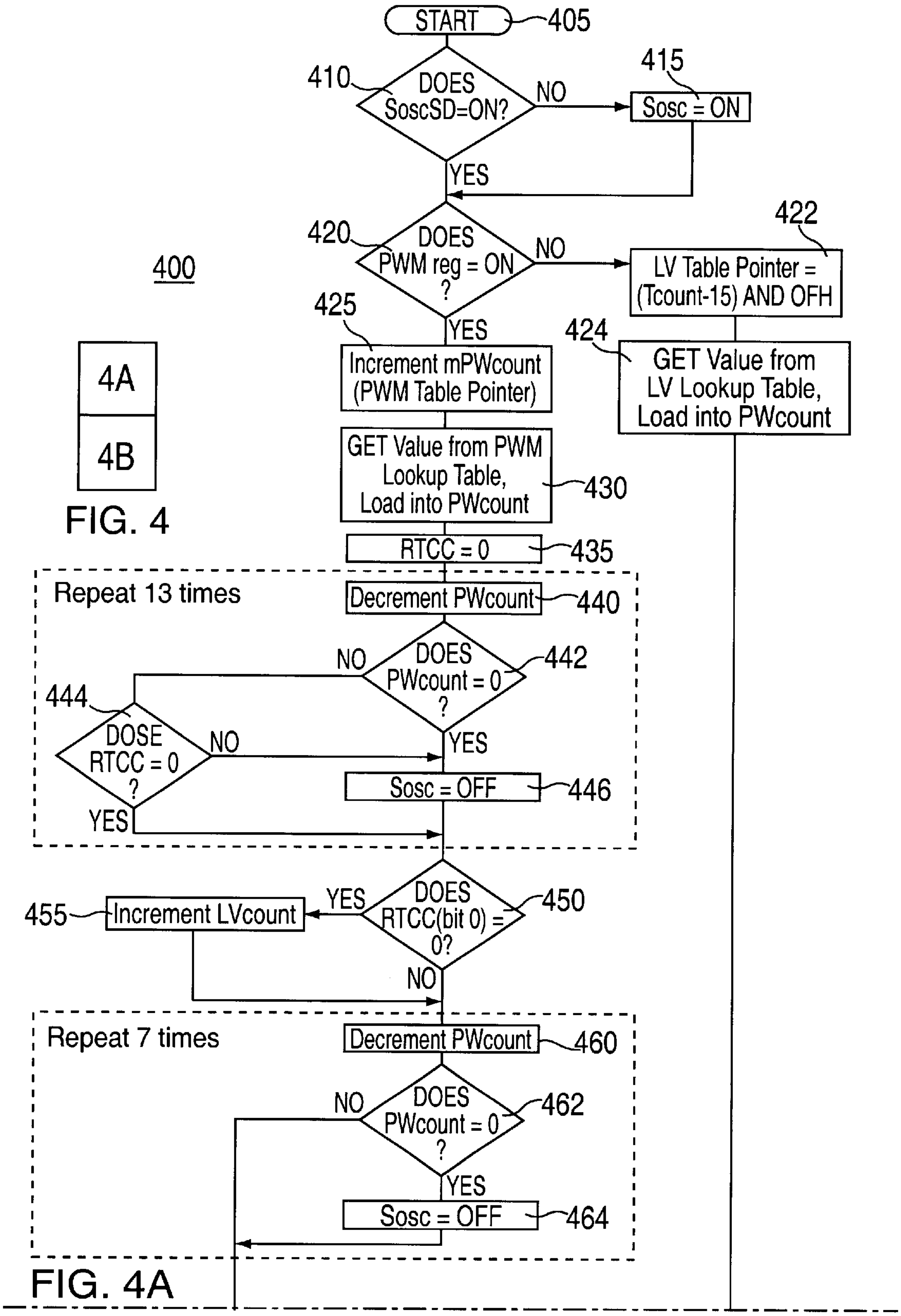
FIG. 4 illustrates a flowchart of PWM Program No. 1 of FIG. 3.
Figure 4B:
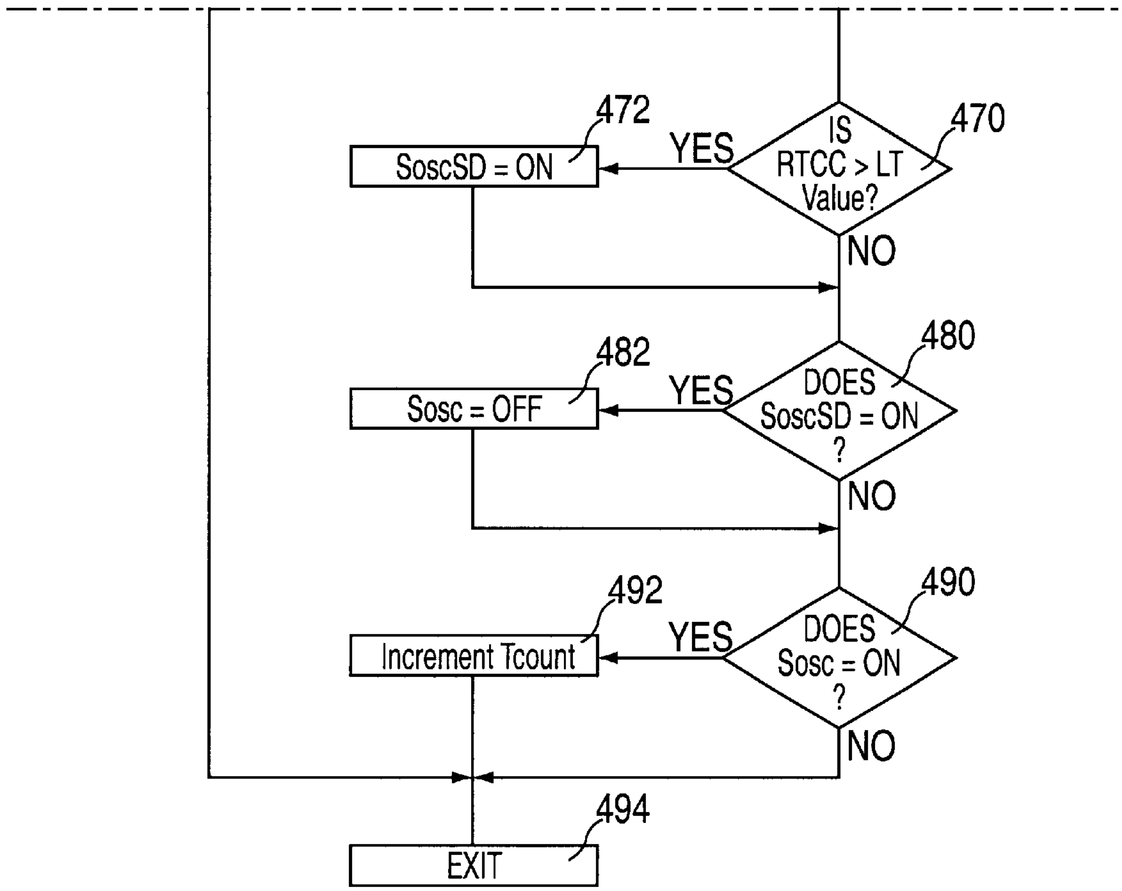

FIG. 4 illustrates a flowchart of PWM Program No. 1 (method 400) of FIG. 3. This program executes during the horn's ON time (120 μsec). Method 400 starts in step 405 and proceeds to step 410. In step 410, method 400 queries whether the variable, "SoscSD", is set to "On". The variable "SoscSD" allows the control of the opto-oscillator to be set by a variable or flag. Namely, variable "SoscSD" is indicative of the "oscillator shut down" function, where "SoscSD=On" indicates that the opto-oscillator is shut down. There are certain situations where it is desirable to turn on or off the opto-oscillator as discussed below. Thus, if the query is affirmatively answered, then method 400 proceeds to step 420. Namely, the opto-oscillator is left off for the present moment. However, if the query is negatively answered, then method 400 proceeds to step 415, where "Sosc" is set to "On".

In step 420, method 400 queries whether the variable, "PWM reg", is equal to "On". If PWMreg is ON, the input voltage is normal to high and a fixed frequency PWM is used to charge the strobe. Thus, method 400 proceeds to step 425. However, if the query is negatively answered (PWMreg is OFF), then method 400 proceeds to step 422, where the input voltage is low and a variable frequency with a PWM envelope is used to charge the strobe in step 422.

In step 425, the PWM table pointer, mPWcount, is incremented by method 400 and then is used to get a value from the PWM Look-up Table in step 430. The value is loaded into Pwcount and RTCC is set to zero in step 435.

At this point, method 400 executes thirteen identical blocks of code, i.e., steps 440–446. Each block consists of: Pwcount is decremented in step 440 and checked if it equals zero in step 442. Pwcount is initially set to 19 before being decremented. If Pwcount is zero or if RTCC is not zero per query 444, Sosc is set to OFF in step 446. (Each block executes in 5 $\mu$sec).

In step 450, method 400 queries if RTCC (bit 0) is equal to zero, i.e., RTCC's bit 0 is checked and if it is zero, then Lvcount is incremented in step 455. (The Lvcount value is used in determining if PWMreg should be ON or OFF).

Next, method 400 executes seven identical blocks of code ,i.e., steps 460–464 consisting of: Pwcount is decremented in step 460 and checked in step 462 if it equals zero. If Pwcount equals zero, Sosc is set to OFF in step 464 and this branch of PWM is finished). (Each block executes in 5 $\mu$sec).

In step 422, the LV table pointer is calculated from the Tcount value. (The reason for modifying Tcount is that a short look-up table is used and Tcount is adjusted to prevent it from pointing outside the table). Using the adjusted Tcount value as a table pointer, an LT value is retrieved from the LV Look-up Table in step 424.

Next, RTCC is checked in step 470 to determine if it is greater than the LT value and if so, SoscSD is set to ON in step 472. If SoscSD is set to ON as checked in step 480, then Sosc is set to OFF in step 482. Lastly, if Sosc is set to ON as checked in step 490, Tcount is incremented in step 492 and the PWM program is concluded in step 494.

Figure 5:
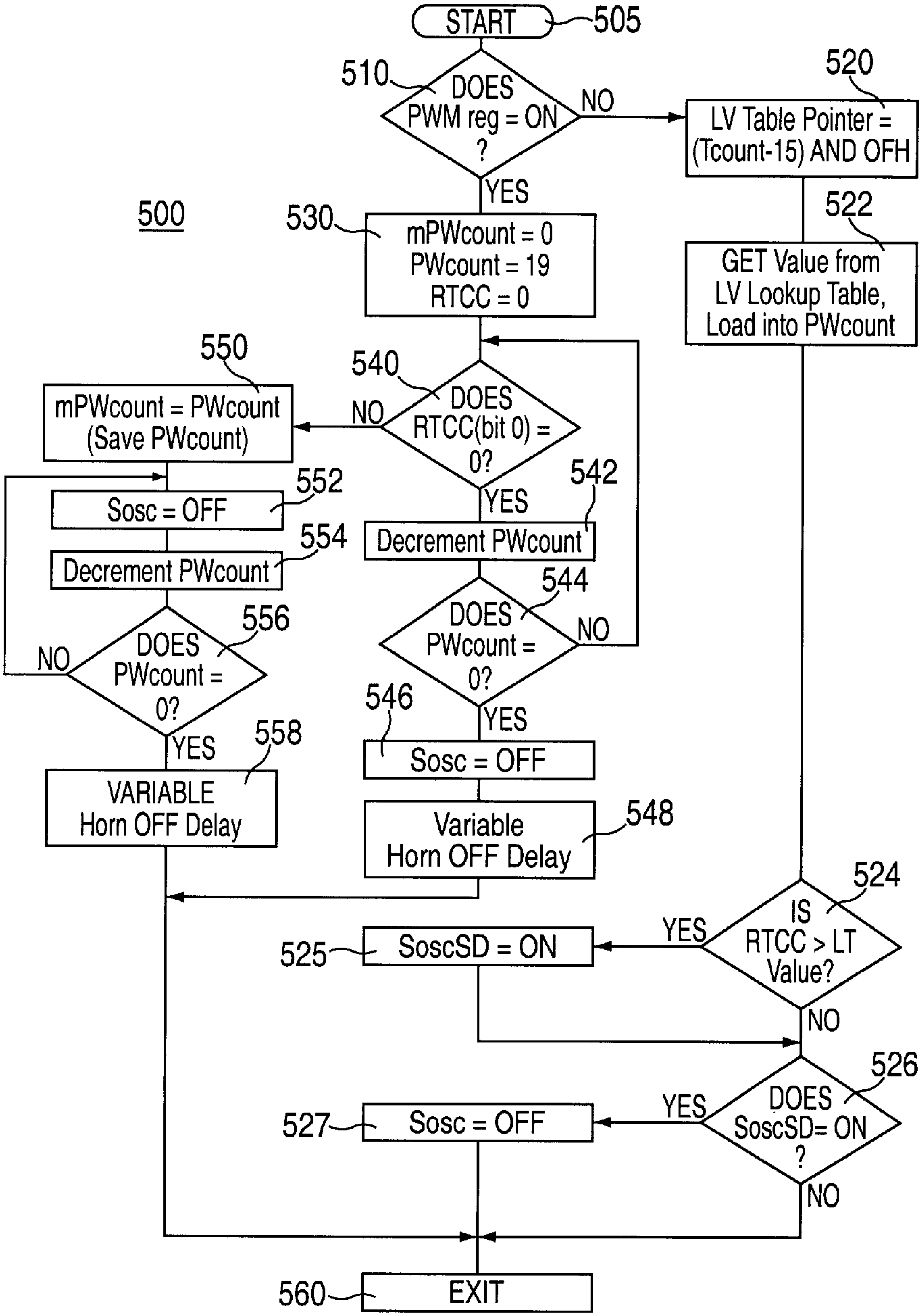
FIG. 5 illustrates a flowchart of PWM Program No. 2 of FIG. 3.

FIG. 5 illustrates a flowchart of PWM Program No. 2 (method 500) of FIG. 3. This PWM program is executed during the horn's OFF time which has a variable execution time (approx. 140 $\mu$sec min.). Method 500 starts in step 505 and proceeds to step 510 where method 500 queries whether PWMreg is "On". If the query is affirmatively answered, then the PWM table pointer and mPWcount are set to zero and Pwcount is set to ineteen and RTCC is also set to zero in step 530.

At this point, method 500 enters a first loop (steps 540–548). In step 540, method 500 queries whether RTCC's is equal to 0. If the query is affirmatively answered, then method 500 proceeds to step 542 where Pwcount is decremented. If Pwcount is not equal to zero as queried in step 544, method 500 returns to the top of the first loop. If PWcount does equal zero, the first loop is exited and the Sosc is set to OFF in step 546 followed by a Variable Horn Delay time in step 548. At this point, method 500 exits PWM Program #2 in step 560.

If the query is negatively answered in step 540, method 500 enters the second loop. i.e., steps 550–558). In step 550, mPWcount is loaded with the value from Pwcount, thereby saving it as a PWM look-up table pointer.

In step 552, method 500 sets Sosc to OFF. Next, Pwcount is decremented in step 554.

In step 556, method 500 queries whether Pwcount is equal to 0. If the query is affirmatively answered, then method 500 proceeds to step 558 for a Variable Horn Delay time. Next, method 500 exits PWM Program #2 in step 560.

Returning to step 510, if the query is negatively answered (i.e., PWMreg is OFF), then the LV table pointer is calculated from the Tcount value in step 520. Using the adjusted Tcount value as a table pointer, an LT value is retrieved from the LV Look-up Table in step 522.

Next, RTCC is checked in step 524 to determine if it is greater than the LT value and if so, SoscSD is set to ON in step 525. If SoscSD is set to ON as checked in step 526, then Sosc is set to OFF in step 572 the PWM program # 2 is concluded in step 560.

Figure 6:
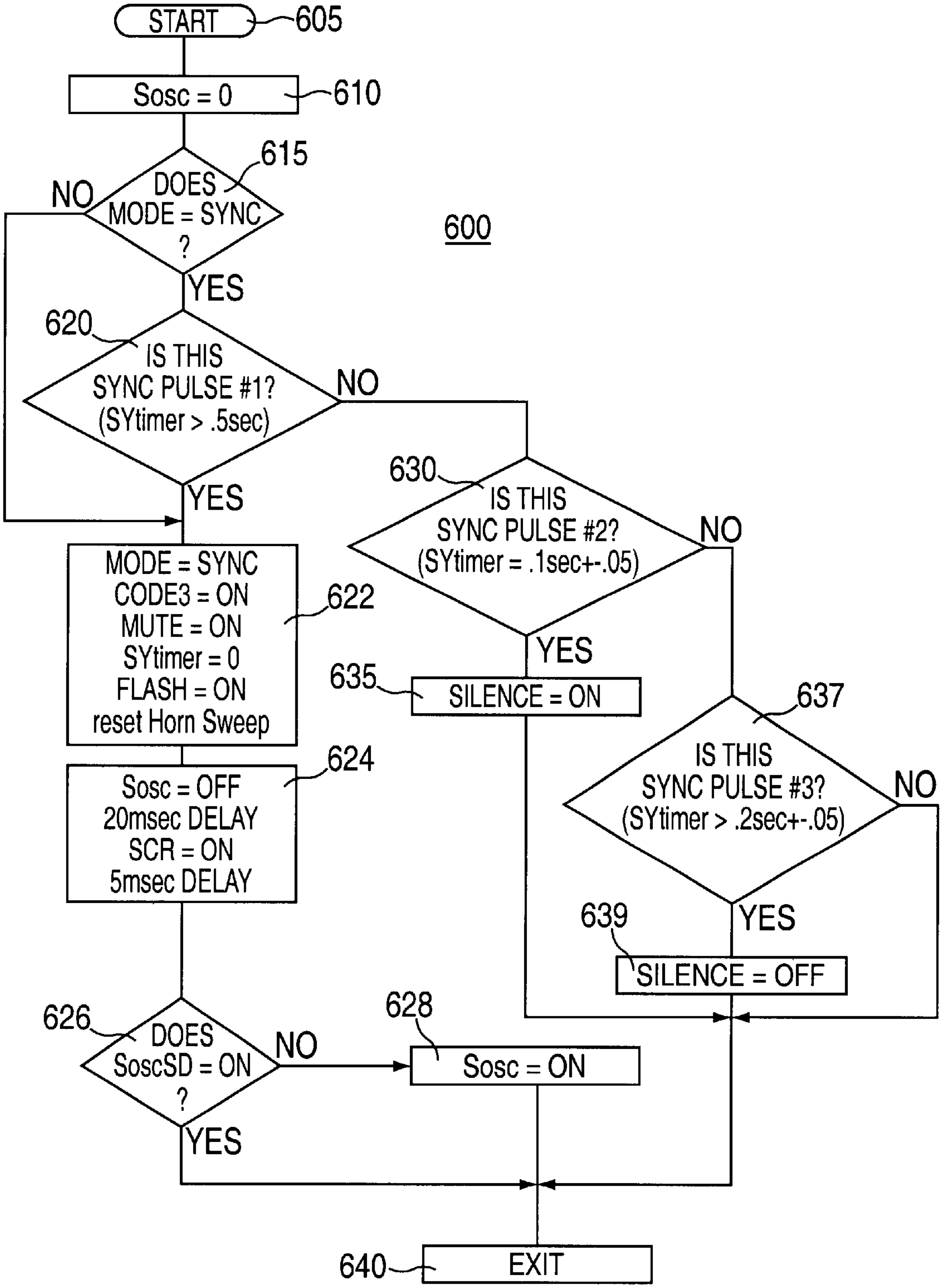
FIG. 6 illustrates a flowchart of Control Program No. 1 of FIG. 3.

FIG. 6 illustrates a flowchart of Control Program No. 1 (method 600) of FIG. 3. More specifically, method 600 starts in step 605 and proceeds to step 610 where Sosc is set equal to 0.

In step 615, method 600 queries whether the operational Mode is set to SYNC. If the query is affirmatively answered, then method 600 proceeds to step 620. If the query is negatively answered, then method 600 proceeds to step 622.

In step 620, method 600 queries whether the detected sync/control pulse is greater than 0.5 seconds, e.g., relative to a previously received sync/control pulse. Namely, the time of detecting the sync/control pulse is stored in the counter "Sytimer" and this stored value is compared to the threshold value of 0.5 seconds. It should be noted that the "SYtimer" can be reset for every strobe flash or for every reception of the sync/control pulse.

Namely, method 600 is determining if the present sync/control pulse is a first, second or third pulse. According to the present invention, the first pulse indicates the beginning of a new synchronization cycle or sync cycle. By way of example, the presence of a second pulse immediately following the first sync pulse activates the "SILENCE" feature throughout the alarm system and turns off any audio alarm which may be sounding. Namely, if the present sync/control pulse is a first pulse then it is a reference synchronization pulse. If the present sync/control pulse is a second pulse, then it is a control pulse for the "SILENCE" feature. If the present sync/control pulse is the third pulse, then it is a control pulse for re-sound, thereby turning off the "SILENCE" feature. Thus, if the query in step 620 is affirmatively answered, then method 600 determines that the present sync/control pulse is a reference synchronization pulse and proceeds to step 622. If the query in step 620 is negatively answered, then method 600 proceeds to step 630.

In step 630, method 600 queries whether the detected sync/control pulse is 0.1 second plus or minus 0.05 second relative to a previously received sync/control pulse. If the query is affirmatively answered, then method 600 proceeds to step 635, where the "SILENCE" feature is turned "On". If the query is negatively answered, then method 600 proceeds to step 637.

In step 637, method 600 queries whether the detected sync/control pulse is 0.2 second plus or minus 0.05 second relative to a previously received sync/control pulse. If the query is affirmatively answered, then method 600 proceeds to step 639, where the "SILENCE" feature is turned "Off". If the query is negatively answered, then method 600 exits to step 640.

In step 622, method 600 sets several functions or variables. First, the operational mode of the alarm unit is set to "SYNC"mode, where the operation of the alarm unit will be controlled by sync/control pulses. Second, the Code 3 pattern is activated. Third, "MUTE" is turned "ON", i.e., upon reception of a reference synchronization pulse, a period of silence is provided, e.g., the start of a Code 3 pattern. Fourth, the counter "SYtimer" is reset to zero (0). Fifth, a flash control bit, "Flash" is set to "ON". Finally, the HORN SWEEP is also reset to its starting position, e.g., 3600 Hz.

In step 624, method 600 sets several functions or variables. First, Sosc is turned "Off". Second, method 600 takes a 20 msec delay. Third, SCR is turned "On". Fourth, method 600 takes a 5 msec delay.

In step 626, method 600 queries whether the variable, "SoscSD", is set to "On". The variable "SoscSD" allows the control of the opto-oscillator to be set by a variable or flag. Namely, variable "SoscSD" is indicative of the "oscillator shut down" function, where "SoscSD=On" indicates that the opto-oscillator is shut down. There are certain situations where it is desirable to turn on or off the opto-oscillator as discussed below. Thus, if the query is affirmatively answered, then method 600 proceeds to step 640. Namely, the opto-oscillator is left off for the present moment. However, if the query is negatively answered, then method 600 proceeds to step 628, where "Sosc" is set to "On".

Figure 7A:
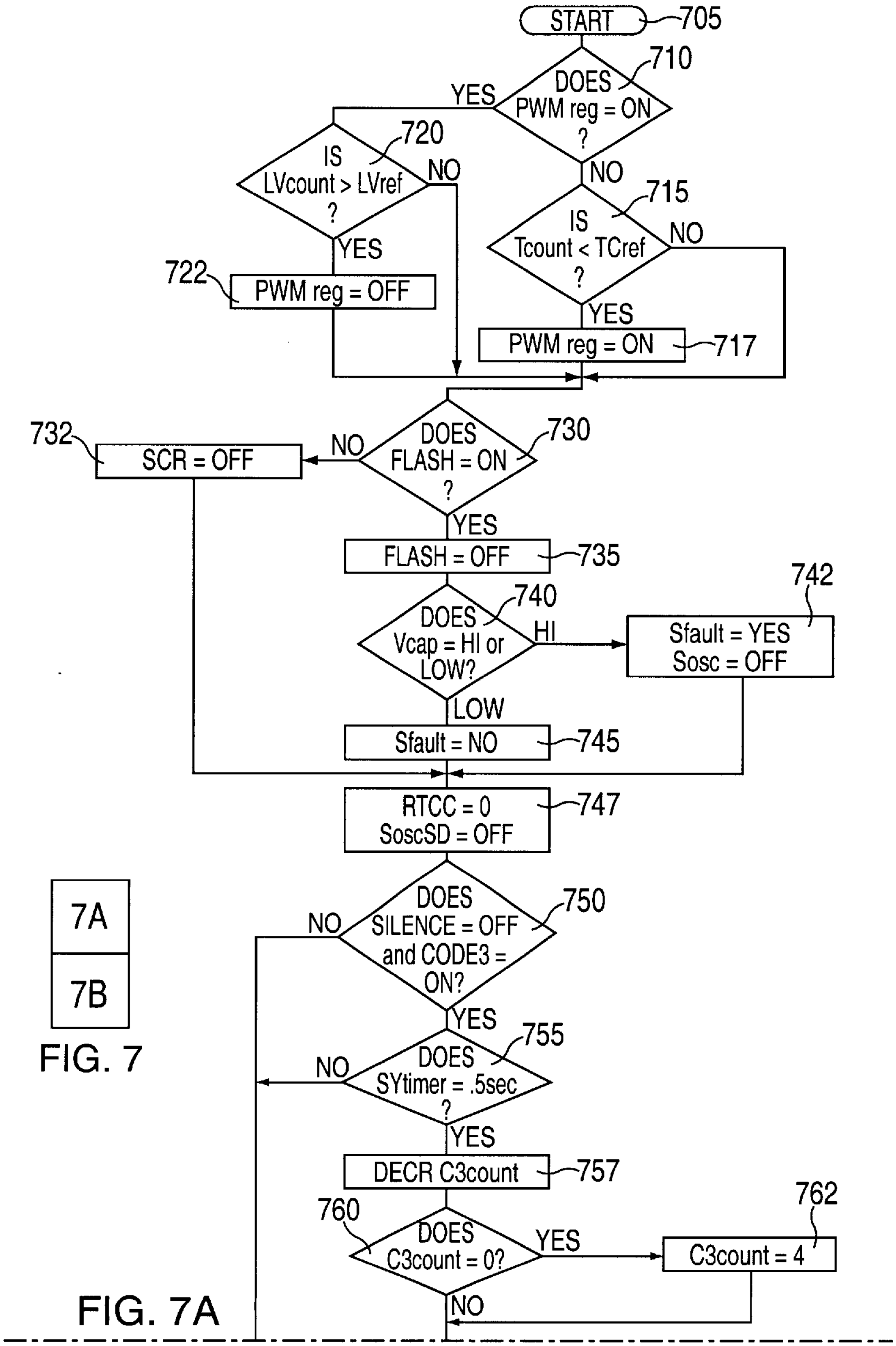
FIG. 7 illustrates a flowchart of Control Program No. 2 of FIG. 3.
Figure 7B:
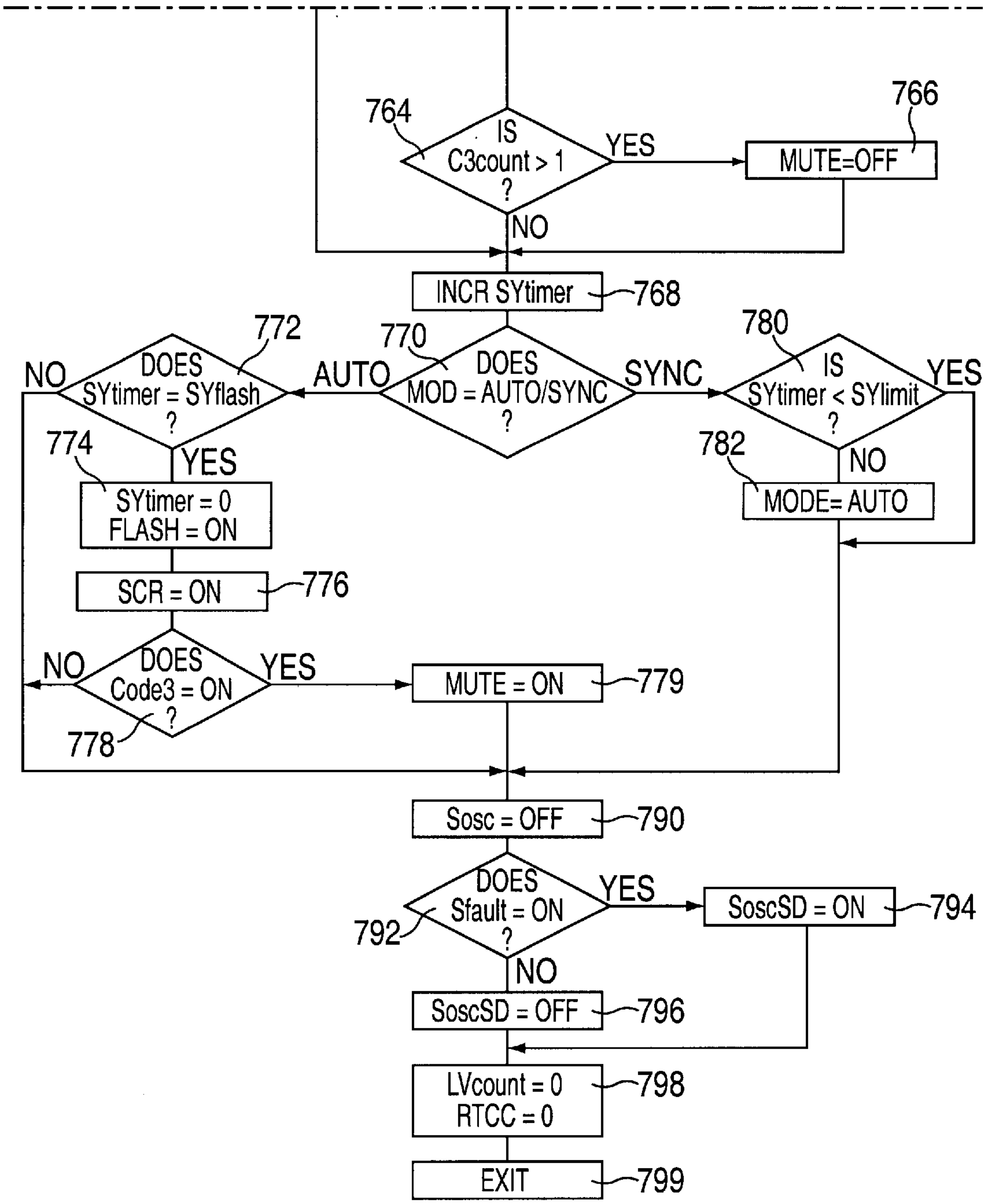

FIG. 7 illustrates a flowchart of Control Program No. 2 (method 700) of FIG. 3. This Control Program is executed every time the horn sweep reaches maximum or minimum (approx. 110 times per second). Namely, FIG. 7 illustrates a method 700 for detecting low input voltage and for maintaining a plurality of counters that are used to detect the absence of a reference synchronization pulse and to implement the Code 3 pattern.

More specifically, method 700 starts in step 705 and proceeds to step 710 where method 700 queries whether PWM reg is turned "On". If the query is negatively answered, then Tcount is compared to TCref in step 715. If Tcount is less than Tcref, PWMreg is turned ON in step 717. If the query is affirmatively answered in step 710, then, LVcount is compared to LVref in step 720. If LVcount is greater than LVref, PWMreg is turned OFF in step 722.

In step 730, method 700 queries whether the function "FLASH" is set to "On". If the query is affirmatively answered, then method 700 proceeds to step 735 where "FLASH" is turned "Off". If the query is negatively answered, then method 700 proceeds to step 732, where the SCR is turned off. Namely, the SCR Q3 of the alarm unit is turned off.

In step 740, method 700 queries whether the variable "Vcap" is set to "Hi" or "Low". Vcap is represented by terminal 10 of U1 in FIG. 2. If "Vcap" is "Hi", then method 700 proceeds to step 742. If "Vcap" is "Low", then method 700 proceeds to step 745, where the variable "Sfault" is set to "No". Namely, Vcap is a measure of the voltage of the storage capacitor C9 at a particular time. In step 740, method 700 presumes that a flash has just occurred. As such, at this point in time, Vcap under normal condition should reflect a low voltage, whereas a Vcap with a high voltage indicates that a fault has occurred.

In step 742, method 700 sets several functions or variables. First, "Sfault" is set to "Yes", since it is presumed that a fault has occurred where Vcap is "High" after a flash. Second, "Sosc" is turned "Off" to avoid an overcharging condition, since it has been detected that Vcap is still "High" after a flash.

In step 747, method 700 resets "RTCC" to zero and turns off "SoscSD".

In step 750, method 700 queries whether the function "SILENCE" is set to "Off" and the function "Code 3" is set to "On". If the query is affirmatively answered, then method 700 proceeds to step 755. Namely, the Code 3 horn signal pattern has been previously selected and method 700 will now maintain the predefined audio pattern. If the query is negatively answered, then method 700 proceeds to step 768.

In step 755, method 700 queries whether "Sytimer" is equal to 0.5 second. If the query is affirmatively answered, then method 700 decrements a counter "C3count" in step 757. The counter "C3count" is employed to produce the Code 3 audio pattern. If the query is negatively answered, then method 700 proceeds to step 768.

In step 760, method 700 queries whether the counter "C3count" is equal to zero (0). Namely, method 700 is checking whether the end of the Code 3 pattern has been reached. If the query is affirmatively answered, then method 700 resets the counter "C3count" to a value of four (4) in step 762. If the query is negatively answered, then method 700 proceeds to step 768.

In step 764, method 700 queries whether the counter "C3count" is greater than one (1). If the query is affirmatively answered, then method 700 sets the function "MUTE" to "Off" in step 766 in preparation to sound the horn. If the query is negatively answered, then method 700 proceeds to step 768.

Each reference synchronization pulse triggers a set of three (3) one-half second of silence followed by a one-half second horn blast, and one (1) one and one-half second of silence.

In step 768, method 700 increments "Sytimer", which tracks the elapsed time from strobe flash to strobe flash. Since Control Program NO. 2 is executed at the end of a sweep up or sweep down cycle, each increment of "Sytimer" represents a particular time duration, e.g., 0.0083 second.

In step 770, method 700 queries whether the operational "Mode" is set to "Auto or Sync". If the query is answered "Sync", then method 700 proceeds to step 780. If the query is answered "Auto", then method 700 proceeds to step 772.

In step 780, method 700 queries whether "SYtimer" is less than "SYlimit". If the query is affirmatively answered, then method 700 proceeds to step 790. If the query is negatively answered, then method 700 proceeds to step 782, where operational "Mode" is set to "Auto". Namely, method 700 compares "SYtimer" to a predetermined maximum time, "Sylimit", in which case, method 700 expects a sync pulse to arrive relative to the previous strobe flash. "Sylimit" can be set equal to 1.1 seconds in one embodiment. As such, if "SYtimer" is not less than "SYlimit", then there is a problem with the sync pulses and the operating mode of the alarm unit is switched to "Auto".

In step 772, method 700 queries whether "SYtimer" is equal to "SYflash". "SYflash" is a preset value that indicates a time in which the alarm unit should flash, e.g., once every second or after the reception of a reference synchronization pulse. It should be understood that "SYflash" can be modified to a different time duration in accordance with a particular application. If the query in step 772 is affirmatively answered, then method 700 proceeds to step 774 where "SYtimer" is reset to Zero (0) and "Flash" is set "On". Namely, it is time to trigger a flash. If the query is negatively answered, then method 700 proceeds to step 790. Namely, insufficient time has elapsed to trigger a flash. In step 776, SCR is turned "On".

In step 778, method 700 queries whether Code3 is "On". If the query is negatively answered, then method 700 proceeds to step 790. If the query is affirmatively answered, then method 700 proceeds to step 779 where Mute is turned "On". In step 790, Sosc is turned "Off".

In step 792, method 700 queries whether "Sfault" is set to "On". If the query is affirmatively answered, then method 700 proceeds to step 794 where SoscSD is turned "On". If the query is negatively answered, then method 700 proceeds to step 796 where SoscSD is turned "Off".

In step 798, method 700 sets LVcount and RTCC equal to 0. Method 700 exits in step 799.

Figure 8:
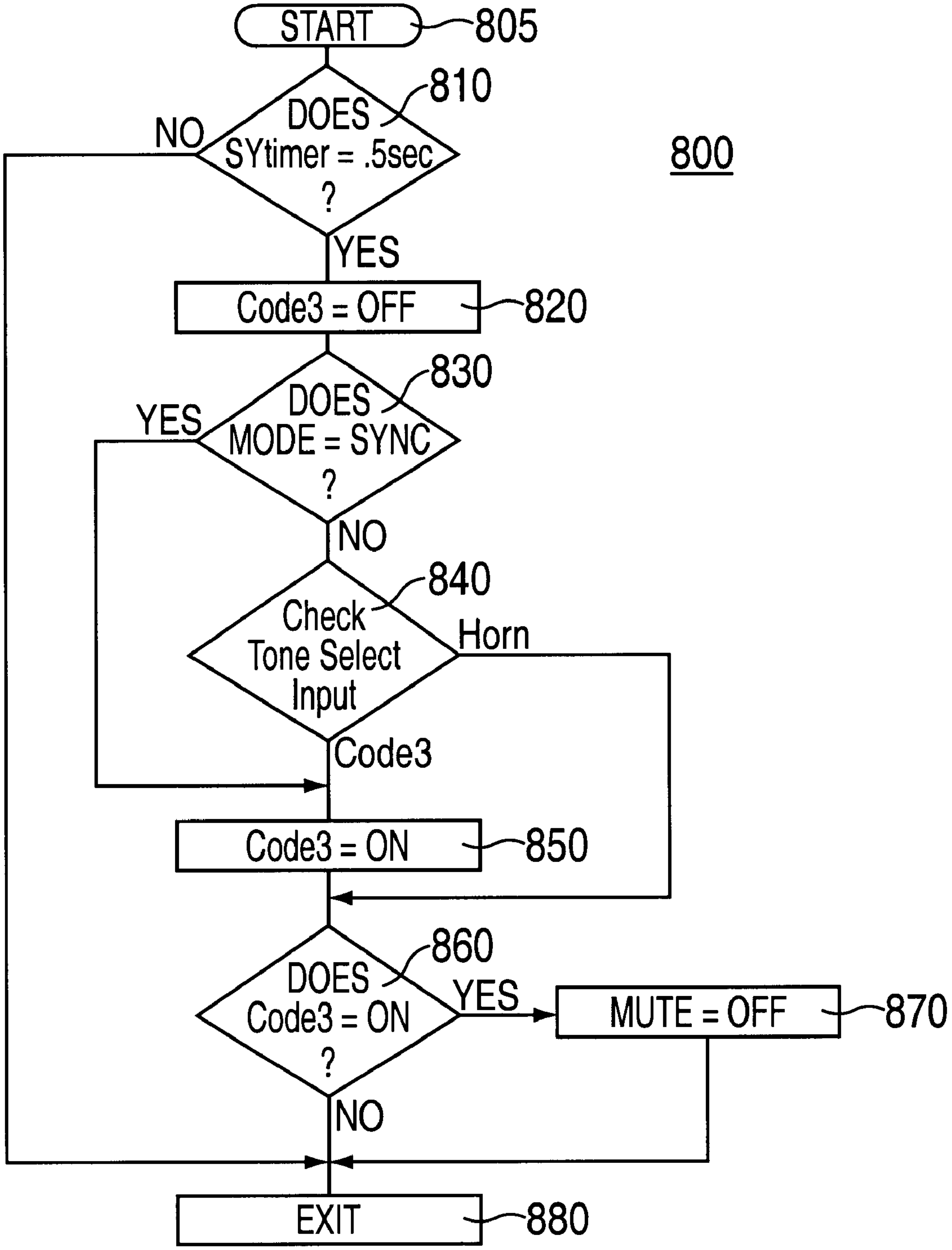
FIG. 8 illustrates a flowchart of Control Program No. 3 of FIG. 3.

FIG. 8 illustrates a flowchart of Control Program No. 3 (method 800) of FIG. 3. This Control Program is executed only if Sytimer equals 0.5 seconds.

More specifically, method 800 starts in step 805 and proceeds to step 810 where method 800 queries whether "Sytimer" is equal to 0.5 second. If the query is affirmatively answered, then method 800 turns Code3 "Off" in step 820. If the query is negatively answered, then method 800 proceeds to step 880.

In step 830, method 800 queries whether the operational Mode is "Sync". If the query is affirmatively answered, then method 800 turns Code3 "On" in step 850. If the query is negatively answered, then method 800 proceeds to step 840 where method 800 checks the Tone Select Input. Tone Select Input is pin 8 of U1 in FIG. 2. If Code3 is selected, then method 800 proceeds to step 850. If "horn" is selected, then method 800 proceeds to step 860.

In step 860, method 800 queries whether Code3 is "On". If the query is affirmatively answered, then method 800 turns Mute "On" in step 870. If the query is negatively answered, then method 800 ends in step 880.

Although various embodiments which incorporate the teachings of the present invention have been shown and described in detail herein, those skilled in the art can readily devise many other varied embodiments that still incorporate these teachings.

What is claimed is:

1. An alarm unit, comprising:

a switch having a plurality of selectable positions representative of a plurality of intensity settings;

a flash circuit having a first storage capacitor, a flashtube and a voltage doubler having a second capacitor for generating a flash; and a controller coupled to said switch and said flash circuit, for triggering said flash having an intensity that is in accordance with a selected position of said switch, wherein said triggering causes a voltage stored in said first storage capacitor and a voltage stored in said second capacitor to be presented to said flashtube simultaneously.

2. The alarm unit of claim 1, wherein said plurality of intensity settings comprise two intensity settings.

3. The alarm unit of claim 1, wherein said plurality of intensity settings comprise three intensity settings.

4. The alarm unit of claim 1, wherein said plurality of intensity settings comprise four intensity settings.

5. The alarm unit of claim 4, wherein said four intensity settings are 15 candela, 30 candela, 75 candela and 110 candela.

6. The alarm unit of claim 1, wherein said plurality of intensity settings comprise at least two intensity settings, wherein said at least two intensity settings define an intensity range exceeding 35 candela.

7. The alarm unit of claim 1, wherein said switch is a component of a strobe oscillator.

8. The alarm unit of claim 1, wherein said first storage capacitor and said second capacitor of said voltage doubler operate from a common voltage supply.

9. The alarm unit of claim 8, wherein said storage capacitor serves to double an amount of voltage that is presented across said flashtube.

10. The alarm unit of claim 8, wherein said voltage doubler further comprises a diode that is coupled to said storage capacitor.

11. A method of operating an alarm unit, said method comprising the steps of:

a) using a switch having a plurality of selectable positions representative of a plurality of intensity settings to select one of said intensity settings;

b) using a flash circuit having a first storage capacitor, a flashtube and a voltage doubler having a second capacitor for generating a flash; and c) using a controller coupled to said switch and said flash circuit, for triggering said flash having an intensity that is in accordance with a selected position of said switch, wherein said triggering causes a voltage stored in said first storage capacitor and a voltage stored in said second capacitor to be presented to said flashtube simultaneously.

12. The method of claim 11, wherein said plurality of intensity settings comprise two intensity settings.

13. The method of claim 11, wherein said plurality of intensity settings comprise three intensity settings.

14. The method of claim 11, wherein said plurality of intensity settings comprise four intensity settings.

15. The method of claim 14, wherein said four intensity settings are 15 candela, 30 candela, 75 candela and 110 candela.

16. The method of claim 11, wherein said plurality of intensity settings comprise at least two intensity settings, wherein said at least two intensity settings define an intensity range exceeding 35 candela.

17. The method of claim 11, wherein said step a) uses a switch that is a component of a strobe oscillator.

18. The method of claim 11, wherein said step b) uses said flash circuit, where said first storage capacitor and said second capacitor of said voltage doubler operate from a common voltage supply.

19. The method of claim 18, wherein said step b) uses said voltage doubler having a storage capacitor to double an amount of voltage that is presented across said flashtube.

20. The method of claim 18, wherein said step b) further uses said voltage doubler having a diode that is coupled to said storage capacitor.

* * * * *

UNITED STATES PATENT AND TRADEMARK OFFICE

CERTIFICATE OF CORRECTION

PATENT NO. : 6,311,021 B1
DATED : October 30, 2001
INVENTOR(S) : Kosich

It is certified that error appears in the above-identified patent and that said Letters Patent is hereby corrected as shown below:

Column 3,
Line 15, please replace " an light" with -- a light --.
Line 21, please delete " 30".

Column 7 & 8,
Line 4, in the table below, please replace " RT" with -- R/T --.

Column 11,
Line 54, please replace " loop. i.e.," with -- loop (i.e., --.

Signed and Sealed this

Fourteenth Day of May, 2002

*Attest:*

JAMES E. ROGAN
*Director of the United States Patent and Trademark Office*

*Attesting Officer*